United States Patent
Castleman et al.

(10) Patent No.: US 9,330,415 B1
(45) Date of Patent: May 3, 2016

(54) PERSONAL SAVINGS PLAN

(75) Inventors: Wendy Ann Castleman, San Jose, CA (US); Christopher L. Battles, San Francisco, CA (US); Ryan Michael Steckler, San Diego, CA (US); Christopher Stephen Riche, Reno, NV (US); Kelly Rohrbach, Mountain View, CA (US); John R. Caldwell, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 549 days.

(21) Appl. No.: 12/914,912

(22) Filed: Oct. 28, 2010

(51) Int. Cl.
*G06Q 40/00* (2012.01)

(52) U.S. Cl.
CPC ...................... *G06Q 40/00* (2013.01)

(58) Field of Classification Search
CPC ..................................................... G06Q 40/00
USPC .................. 705/35, 36 T, 37, 39, 40
See application file for complete search history.

(56) References Cited

U.S. PATENT DOCUMENTS

| | | | | |
|---|---|---|---|---|
| 7,024,389 | B1* | 4/2006 | Watkins | G06Q 20/02 705/26.1 |
| 8,160,952 | B1* | 4/2012 | Fell | G06Q 30/06 705/26.1 |
| 2002/0069150 | A1* | 6/2002 | Ni | 705/36 |
| 2002/0184148 | A1* | 12/2002 | Kahn et al. | 705/40 |
| 2003/0018557 | A1* | 1/2003 | Gilbert et al. | 705/36 |
| 2003/0074311 | A1* | 4/2003 | Saylors | G06Q 20/10 705/39 |
| 2004/0019545 | A9* | 1/2004 | Polk | 705/35 |
| 2004/0111361 | A1* | 6/2004 | Griffiths | G06Q 20/02 705/39 |
| 2007/0061251 | A1* | 3/2007 | Watkins | G06Q 40/02 705/39 |
| 2010/0228660 | A1* | 9/2010 | Polk | 705/35 |
| 2010/0299251 | A1* | 11/2010 | Thomas | G06Q 20/10 705/39 |
| 2011/0106696 | A1* | 5/2011 | Seven | G06Q 20/06 705/40 |

OTHER PUBLICATIONS

Income Smoothing and Self-Control: The Case of Schoolteachers Mayer, Thomas ; Russell, Thomas .Economic Inquiry 43.4 (Oct. 2005): 823-830.*

* cited by examiner

*Primary Examiner* — Lalita M Hamilton
(74) *Attorney, Agent, or Firm* — Osha Liang LLP

(57) ABSTRACT

A method for saving money through payroll withholding, including: obtaining, for a tax year, a projected tax liability of an employee and a target savings amount selected by the employee; identifying, for the tax year, multiple pay periods for the employee; calculating multiple of tax withholding amounts for the multiple pay periods based on the projected tax liability; calculating multiple savings withholding amounts for the multiple pay periods based on the target savings amount; withholding the multiple tax withholding amounts and the multiple savings withholding amounts from multiple paychecks of the employee corresponding to the multiple pay periods; sending the multiple tax withholding amounts to a tax authority for paying the projected tax liability; and disbursing the target savings amount from a financial account funded by the multiple savings withholding amounts.

14 Claims, 5 Drawing Sheets

PERSONAL SAVINGS PLAN

BACKGROUND

Filing personal income taxes is a difficult endeavor for most taxpayers. As the complexity of the tax code has increased steadily in the past few decades, so too has the difficulty for individuals in maintaining compliance. This has contributed to the popularity of tax preparation software for electronic preparation and filing of personal income taxes.

Though many taxpayers file their income taxes under the advisement of tax preparation software and/or a tax professional (i.e., a certified public accountant), many are given little advisement in selecting allowances and/or making preparations for filing prior to the end of the tax year. This is complicated by the fact that some State and Federal governments charge penalties for underpayment of taxes if a taxpayer's annual withholding is less than their tax liability for the year. As a result, most taxpayers claim less allowances than they are entitled to and end up overpaying their taxes.

As tax refund checks have become ubiquitous in the world of personal finance, companies have capitalized on this by providing refund anticipation loans so that taxpayers can receive their tax refund immediately upon (or shortly after) filing. This and other practices reflect the ever-expanding complexity of the tax system and the growing demand for simple and economical alternatives to large tax withholdings/refunds and/or disciplined saving and investing.

SUMMARY

In general, in one aspect, the invention relates to a method for saving money through payroll withholding. The method comprises: obtaining, for a tax year, a projected tax liability of an employee and a target savings amount selected by the employee; identifying, for the tax year, a plurality of pay periods for the employee; calculating, by a hardware processor, a plurality of tax withholding amounts for the plurality of pay periods based on the projected tax liability; calculating, by the hardware processor, a plurality of savings withholding amounts for the plurality of pay periods based on the target savings amount; withholding the plurality of tax withholding amounts and the plurality of savings withholding amounts from a plurality of paychecks of the employee corresponding to the plurality of pay periods; sending the plurality of tax withholding amounts to a tax authority for paying the projected tax liability; and disbursing, after withholding the plurality of savings withholding amounts, the target savings amount from a financial account funded by the plurality of savings withholding amounts.

In general, in one aspect, the invention relates to a system for saving money through payroll withholding. The system comprises: a hardware processor; a web portal executing on the hardware processor and comprising functionality to: receive, for a tax year, a projected tax liability of an employee and a target savings amount from the employee; and a payroll system comprising a withholdings module executing on the hardware processor, and comprising functionality to: identify, for the tax year, a plurality of pay periods for the employee; calculate, by the withholdings module, a plurality of tax withholding amounts for the plurality of pay periods based on the projected tax liability; calculate, by the withholdings module, a plurality of savings withholding amounts for the plurality of pay periods based on the target savings amount; withhold, by the withholdings module, the plurality of tax withholding amounts and the plurality of savings withholding amounts from a plurality of paychecks of the employee corresponding to the plurality of pay periods; send the plurality of tax withholding amounts to a tax authority for paying the projected tax liability; and disburse, after withholding the plurality of savings withholding amounts, the target savings amount from a financial account funded by the plurality of savings withholding amounts.

In general, in one aspect, the invention relates to a computer-readable storage medium storing a plurality of instructions for saving money through payroll withholding. The plurality of instructions comprising functionality to: obtain, for a tax year, a projected tax liability of an employee and a target savings amount selected by the employee; identify, for the tax year, a plurality of pay periods for the employee; calculate a plurality of tax withholding amounts for the plurality of pay periods based on the projected tax liability; calculate a plurality of savings withholding amounts for the plurality of pay periods based on the target savings amount; withhold the plurality of tax withholding amounts and the plurality of savings withholding amounts from a plurality of paychecks of the employee corresponding to the plurality of pay periods; send the plurality of tax withholding amounts to a tax authority for paying the projected tax liability; and disburse, after withholding the plurality of savings withholding amounts, the target savings amount from a financial account funded by the plurality of savings withholding amounts.

Other aspects of the invention will be apparent from the following description and the appended claims.

DETAILED DESCRIPTION

Figure 1:
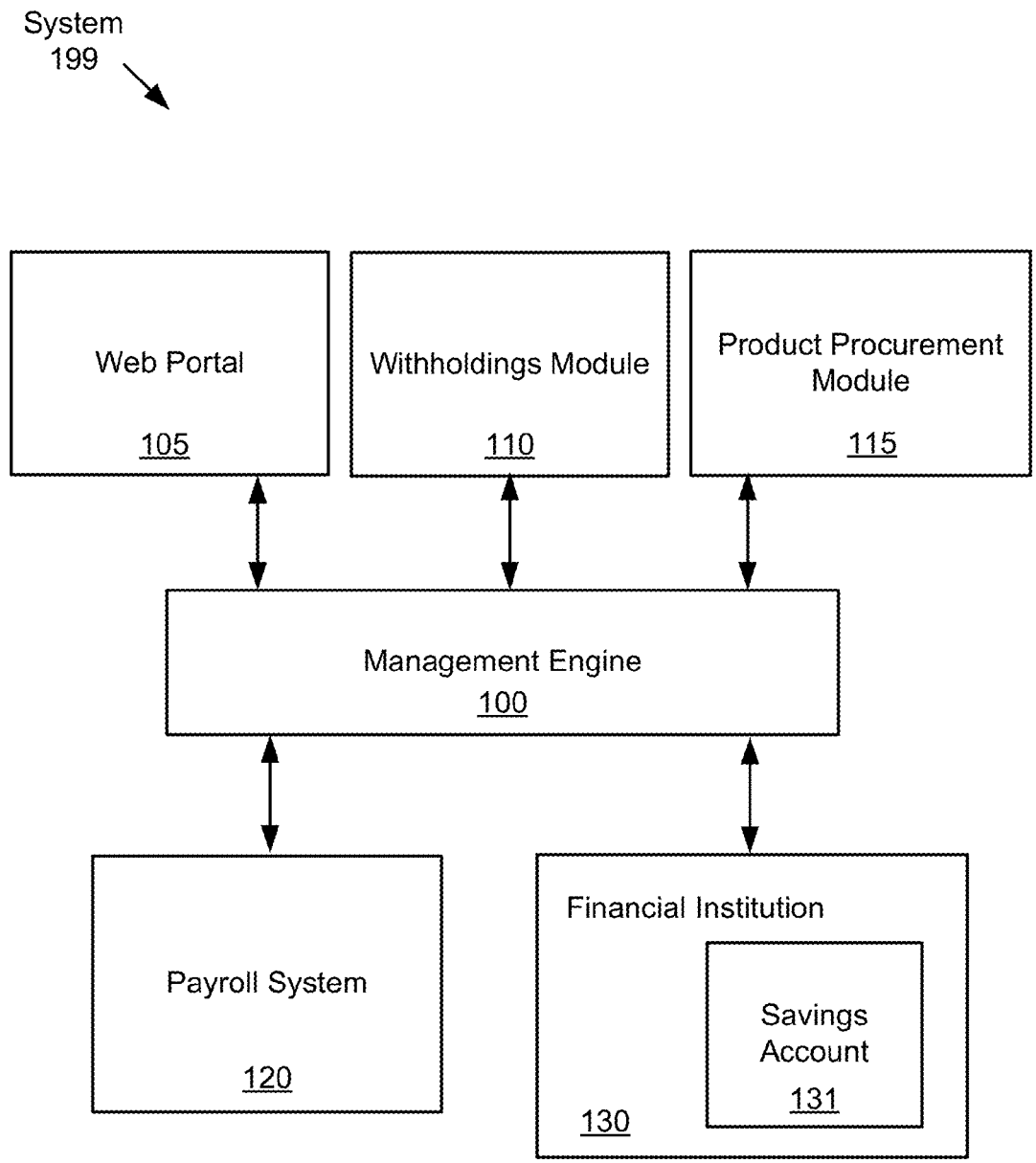
FIG. 1 depicts a schematic block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for implementing a savings plan through payroll withholding(s). In general, embodiments of the invention withhold multiple savings withholding amounts and multiple tax withholding amounts from the paychecks of a user during the tax year. The multiple tax withholding amounts sum to a projected tax liability of the user while the multiple savings withholding amounts sum to a target savings amount specified by the user. The target savings amount may be disbursed to the user and/or used in the purchase of a target product.

FIG. 1 shows a system (199) in accordance with one embodiment of the invention. As shown in FIG. 1, the system has multiple components including a management engine (100), a web portal (105), a withholdings module (110), and/or a product procurement module (115). The system may communicate or be integrated with a payroll system (120) and/or a savings account (131) of a financial institution (130). These components may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the web portal (105) is configured to receive a definition of a target savings amount from an employee. The target savings amount may be defined for a given tax year or an alternate time period. Subsequently, the web portal (105) may output a savings withholding amount which will be withheld from the employee's pay during each pay cycle of the tax year in order to meet the target savings amount by the end of the year. In one or more embodiments of the invention, the web portal (105) is configured to create a financial account (e.g., savings account (131)) with a financial institution (130). In one or more embodiments, the employee designates an existing account instead of creating a new account. A checking account, savings account, or other type of account capable of storing financial amounts may be used. Also, the account may be in the employee's name or the name of a designated third party. In one or more embodiments of the invention, the web portal (105) imports data, including target savings amounts, from software applications such as a payroll system or a financial management system (FMS). Additionally, authorized third party users may enter and/or modify information, such as the target savings amount, for one or more employees. In one or more embodiments of the invention, a single employee has multiple target savings amounts corresponding to multiple financial accounts.

In one or more embodiments of the invention, the web portal (105) receives input defining one or more savings parameters which allow users to define rules and/or attributes related to the target savings amount, target product, financial account, and/or withholdings. Savings parameters may include security settings identifying authorized users and user groups. Savings parameters may also define minimum and/or maximum modification amounts for the target savings amount. For example, an employee may define a savings parameter which authorizes her spouse to modify a target savings amount. The savings parameter may include an allowable range for the target savings amount and a time period during which the spouse is permitted to perform the modification.

In one or more embodiments of the invention, the web portal (105) is configured to receive input from a user identifying a target product. As with the target savings amount, the web portal (105) may receive input identifying a tax year (or an alternate time period) and/or other information related to the financial account and/or the product. In one or more embodiments of the invention, the product is purchased for the employee after the tax year or expiration of the alternate time period. The web portal (105) may also receive input from the user identifying a preferred merchant from which to purchase the product. In one or more embodiments of the invention, the employer and/or an authorized third party enter a list of preferred merchants into the web portal (105) from which products may be purchased. In one or more embodiments of the invention, the web portal (105) is configured to receive income and/or a percentage of sales from a preferred merchant in exchange for listing them as a preferred merchant. In one or more embodiments of the invention, the web portal (105) is configured to display a current balance of one or more financial accounts of an employee during the tax year.

In one or more embodiments of the invention, the withholdings module (110) calculates the employee's savings withholding amount for each pay cycle of the tax year (or alternate time period). Thus, if a target savings amount is identified (e.g., by the web portal (105)), the withholdings module (110) may calculate savings withholding amounts such that the accumulated balance of the financial account equals the target savings amount or falls within a predefined range of the target savings amount by the end of the tax year (or alternate period). If a target product is identified (e.g., by the web portal (105)), the withholdings module (110) projects the price of the target product at the end of the tax year and calculates a savings withholding amount for each pay cycle such that the product can be purchased by the end of the tax year (or shortly after the end of the tax year) with the funds withheld. The savings withholding amounts may be deposited into the designated financial account. In the case when a target product is selected, the price of the product may change over the course of the tax year and the withholdings module (110) may modify the projected price of the target product and the savings withholding amounts accordingly. Also, the employee or an authorized user may designate a preferred merchant which may affect the projected price of the product.

In one or more embodiments of the invention, the withholdings module (110) communicates with a payroll system (120). Thus, the withholdings module (110) may send withholding amounts and/or withholding information to the payroll system (120) during periodic payroll processing. In one or more embodiments of the invention, withholding related information includes a financial account number and financial institution routing number so that the withheld amounts can be directly deposited into the designated financial account via electronic funds transfer (EFT). During payroll processing, the withholdings module (110) may communicate this information to the payroll system (120) for each employee whose pay is being processed in the pay cycle. Each employee may have different withholding elections and amounts including pre-tax withholdings such as 401K retirement and flexible spending account (FSA) contributions and post-tax withholdings such as employee stock purchase plan contributions and wage garnishments. Savings withholdings may be itemized on the employee's paystub by the payroll system and may include explanatory text sent by the withholdings module (110) describing the target savings amount and/or the target product.

In one or more embodiments of the invention, the withholdings module (110) is an integrated part of the payroll system (120). By integrating the withholdings module (110) with the payroll system (120) it is possible to perform the functions of the withholdings module (110) within the actual payroll processes for increased efficiency. In one or more embodiments of the invention, when the withholdings module (110) is integrated with the payroll system (120), the withholdings module precisely calculates an employee's projected tax liability based on their projected income for the tax year. Thus, when calculating payroll withholdings, the projected tax liability and other deductions required by the payroll process are calculated and deducted from the employee's net pay along with the savings withholding amount. Throughout the tax year and/or during every pay cycle process, the projected tax liability may be updated so that tax payments are correct. This ensures that the target savings amount is reached at the end of the year with little or no over-payment or under-payment of taxes. In this way, the employee may improve their savings elections without providing a tax-free loan to the government (by over-payment of taxes) or being forced to pay a tax under-payment penalty.

In one or more embodiments of the invention, the product procurement module (115) is configured to purchase the target product at the end of the tax year (or alternate time period). Thus, the savings withholding amount may equal a projected price of the target product. In one or more embodiments of the invention, the projected price of the product is equal to the price at the time the target product is selected. In one or more embodiments of the invention, the product procurement module (115) receives the selection of the target product, projected or current price, preferred merchant(s), and related information from the web portal (105). Throughout the tax year, the product procurement module (115) may update the projected price of the target product and send the updated price to the withholdings module (110) and/or the payroll system (120). Thus, the withholdings module (110) may modify the periodic savings withholding amounts in order to attain the correct yearly withholdings and purchase the product after the tax year. In one or more embodiments of the invention, the withholdings module (110) notifies the user of the updated price and/or requests permission from the user to modify the savings withholding amounts accordingly via the web portal (105), an email message, an SMS notification, or any other means of electronic communication as is obvious to one of ordinary skill in the art. In one or more embodiments of the invention, the product procurement module (115) keeps a fixed projected price for the target product throughout the tax year. In one or more embodiments of the invention, the product procurement module (115) allows the employee to shop for the best price on the product at year end. If the employee shops for the product, the product procurement module (115) may provide a list of preferred merchants to the user, receiving a fixed fee or percentage of sales compensation from the merchants in exchange for being included in the list. In one or more embodiments of the invention, the product procurement module (115) searches for the lowest price among a list of authorized merchants (possibly as designated by the user in the web portal (105)), purchases the target product from the merchant offering the lowest price, and automatically ships the item to an address provided by the employee via the web portal (105). In one or more embodiments of the invention, the withholdings module (110) and the product procurement module (115) reside within the payroll system (120).

In one or more embodiments of the invention, a financial institution (130) administering the financial account (e.g., savings account (131)) periodically pays one or more interest amounts into the financial account. The interest amounts are based on the balance of the financial account. In one or more embodiments of the invention, the savings withholding amounts are reduced based on the amount of the periodic interest payments so that the cumulative balance of the financial account at the end of the tax year equals the target savings amount.

In one or more embodiments of the invention, the provider of the payroll system (120) receives payment from the financial institution (130) in exchange for depositing the employee's money in the financial account. This payment may be a portion or entirety of an interest amount periodically paid by the financial institution on the balance of the account. In one or more embodiments of the invention, the remainder of the interest amount is deposited into the financial account as an incentive to the employee for keeping the account open. Alternatively, the financial institution (130) may pay a one-time fee or a series of periodic fees (e.g., monthly) to the system in exchange for holding the funds in the financial account.

Figure 2:
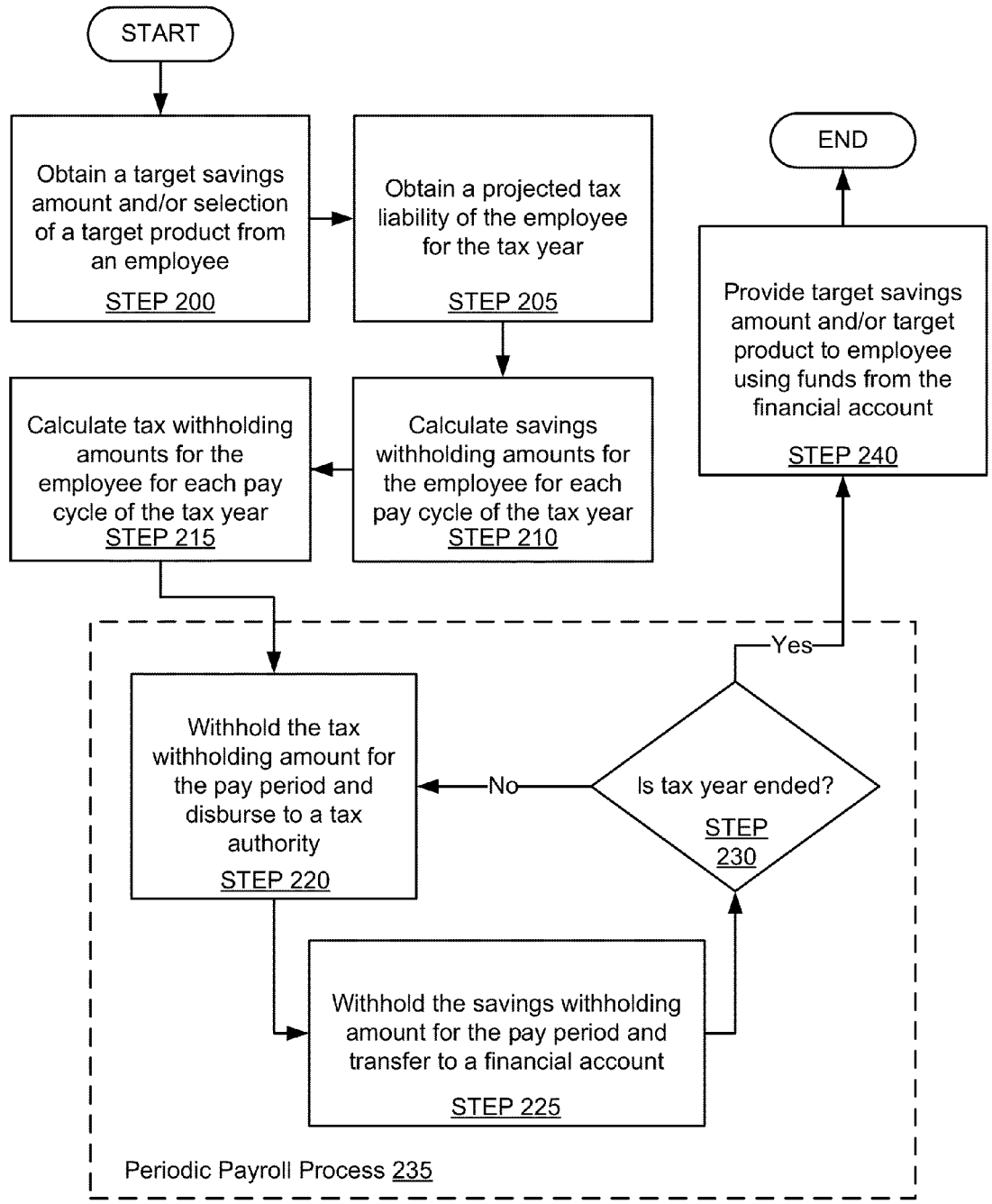
FIGS. 2 and 3 depict flowcharts in accordance with one or more embodiments of the invention.

FIG. 2 shows a flowchart in accordance with one or more embodiments of the invention. The steps of the flowchart shown in FIG. 2 may be used to deposit one or more savings withholding amounts from an employee's pay to a designated financial account. The balance of the financial account may be used for a purchase or made available for withdrawal by the employee after a given date. Those skilled in the art, having the benefit of this detailed description, will appreciate the order and number of steps shown in FIG. 2 may differ among embodiments of the invention. Further, one or more steps in FIG. 2 may be optional.

In STEP 200, a target savings amount is obtained. The target savings amount may be directly specified by an employee or other entity. Alternatively, the target savings amount may correspond to the selection of a target product. The target savings amount may be for a given tax year or an alternate time period defined by the employee or an authorized third party. Thus, the target savings amount is the total amount the employee wishes to be withheld from the employee's pay during the tax year (or alternate time period). In one or more embodiments of the invention, if a target product is selected, the employee and/or employer designate a preferred merchant or a list of preferred merchants. In one or more embodiments of the invention, a projected price of the target product is calculated or obtained from the employee or authorized third party. The target savings amount corresponds to the projected price. The projected price may reflect the anticipated price of the target product at the end of the tax year (or alternate time period) or may be a current price of the product at the time of entry. The projected price may be periodically updated during the tax year to reflect real and anticipated changes in the price of the target product.

In STEP 205, a projected tax liability of the employee is calculated for the tax year (or alternate time period). In one or more embodiments of the invention, the projected tax liability is based on the employee's past payroll amounts. In one or more embodiments of the invention, the projected tax liability is based on a projected annual income amount provided by the employee or employer and/or a pre-defined selection of tax allowances by the employee on a government tax form (e.g., W-4). In one example, this information is obtained by a web portal (e.g., web portal (105), discussed above in reference to FIG. 1) and the calculations are performed by the withholdings module (e.g., withholdings module (110), discussed above in reference to FIG. 1). In one or more embodiments of the invention, by approximating the projected tax liability and adjusting payroll withholding amounts periodically, it is possible to minimize overpayment or underpayment of taxes for the year.

In STEP 210, savings withholding amounts are calculated for the employee. In one or more embodiments of the invention, the sum of the savings withholding amounts equals the target savings amount or falls within a predefined range of the target savings amount. In another embodiment, a projected interest amount may be calculated based on the savings withholding amounts and the sum of the projected interest amount and the savings withholding amounts may equal or exceed the target savings amount.

In STEP 215, tax withholding amounts are calculated for an employee for each pay period of the tax year (or alternate time period) based on the projected tax liability of the employee. In one or more embodiments of the invention, STEPS 210 and 215 may be performed prior to the first pay cycle processed for the tax year and/or may be performed periodically for one or more pay periods throughout the year. In this way, one or more of the tax withholding amounts and/or the savings withholding amounts may be adjusted in response to an adjusted target savings amount and/or changes in the employee's income. Further, two or more steps of the flowchart, and more specifically STEP 210 and STEP 215, may be executed in parallel.

STEPS 220-230 occur periodically in conjunction with a periodic payroll process (235) of an employer. Thus, a single iteration from STEP 220 to STEP 230 may occur in conjunction with various stages of a single pay cycle corresponding to a pay period. These steps may also occur before and/or after the pay cycle in accordance with the embodiments disclosed herein.

In STEP 220 a tax withholding amount for a pay period is withheld from a paycheck of the employee and disbursed to a tax authority. In one or more embodiments of the invention, this coincides with the processing of payroll for the pay period. In one example, the payroll system transfers one or more other portions of the total withholding amount of the employee to various government entities, accounts, and/or third parties. This may include automatic payment of income taxes to federal/state tax authorities and/or specified institutions. Examples of a tax authority include the Internal Revenue Service and the Franchise Tax Board.

In STEP 225, a savings withholding amount for the pay period is withheld and/or transferred to a financial account. In one or more embodiments of the invention, the financial account is an aggregate payroll account of the employer. In another embodiment, the financial account is an account designated by the employee. The financial account may be held by a financial institution selected by the employer and/or employee.

In one or more embodiments of the invention, a total withholding amount of an employee's pay is calculated for a pay cycle (e.g., by a payroll system such as item 120 of FIG. 1). This total withholding amount includes a savings withholding amount as well as income taxes and all other voluntary and involuntary deductions to the employee's pay (e.g., 401K contributions, medical insurance premiums, dental insurance premiums, social security contribution, disability insurance, etc). In one or more embodiments of the invention, the withholdings module (e.g., item 110 of FIG. 1) is integrated with the payroll system and performs all payroll withholdings calculations, including any savings withholdings for a target savings amount as designated by the employee or authorized third party. If the net pay of the employee (for a pay cycle) is sufficient, the total withholding amount will include a savings withholding for a pre-defined target savings amount. In one or more embodiments of the invention, if there are insufficient funds in the employee's net pay for the pay cycle and future savings withholdings are increased during the tax year in order to meet the target savings amount withholding requirements.

In STEP 230, after processing the final pay cycle of the tax year (or alternate time period), the flowchart continues with STEP 240. Otherwise, the periodic payroll process (235) will continue with a return to STEP 220 and the processing of the next pay cycle.

In STEP 240, after processing the final pay cycle of the tax year (or alternate time period), the target savings amount and/or target product are made available to the employee. In one or more embodiments of the invention, if a target savings amount is defined, the balance of the funds in the financial account should equal at least the target savings amount. In one or more embodiments of the invention, if a target product is selected, the product is purchased for the employee or a designated third party and shipped to the employee or designated third party in accordance with one or more savings parameters. In one or more embodiments of the invention, if the funds in the financial account are insufficient to purchase the target product, the funds are made available for withdrawal by the employee or designated third party and/or a message is sent to the employee or designated third party (e.g., by email, SMS, etc.) requesting selection of an alternate product. In one or more embodiments of the invention, the user must select a merchant and approve the price of the target product before it is purchased. This may include placing one or more bids on a product listed on an online auction website. In one or more embodiments, if the price of the target product increases or if there are insufficient funds in the financial account to purchase the product, the employee may add funds to the financial account in order to complete the purchase. In one or more embodiments of the invention, the employee selects a different target product for purchase.

In one or more embodiments of the invention, a list of preferred merchants is presented to the employee after the tax year. The employee may be given a discount for purchasing from a preferred merchant within the list. The preferred merchants may also pay a fee in exchange for being listed. In one or more embodiments of the invention, employees and/or designated product recipients provide product and/or merchant feedback after the purchase. Thus, products and merchants may be rated via aggregate feedback received from users. In one or more embodiments of the invention, if an employee or designated user commits to using a preferred merchant when entering the request for a target product (i.e., via a web portal (105)), they are given a discount on the product by the merchant (at the time of sale).

Figure 3:
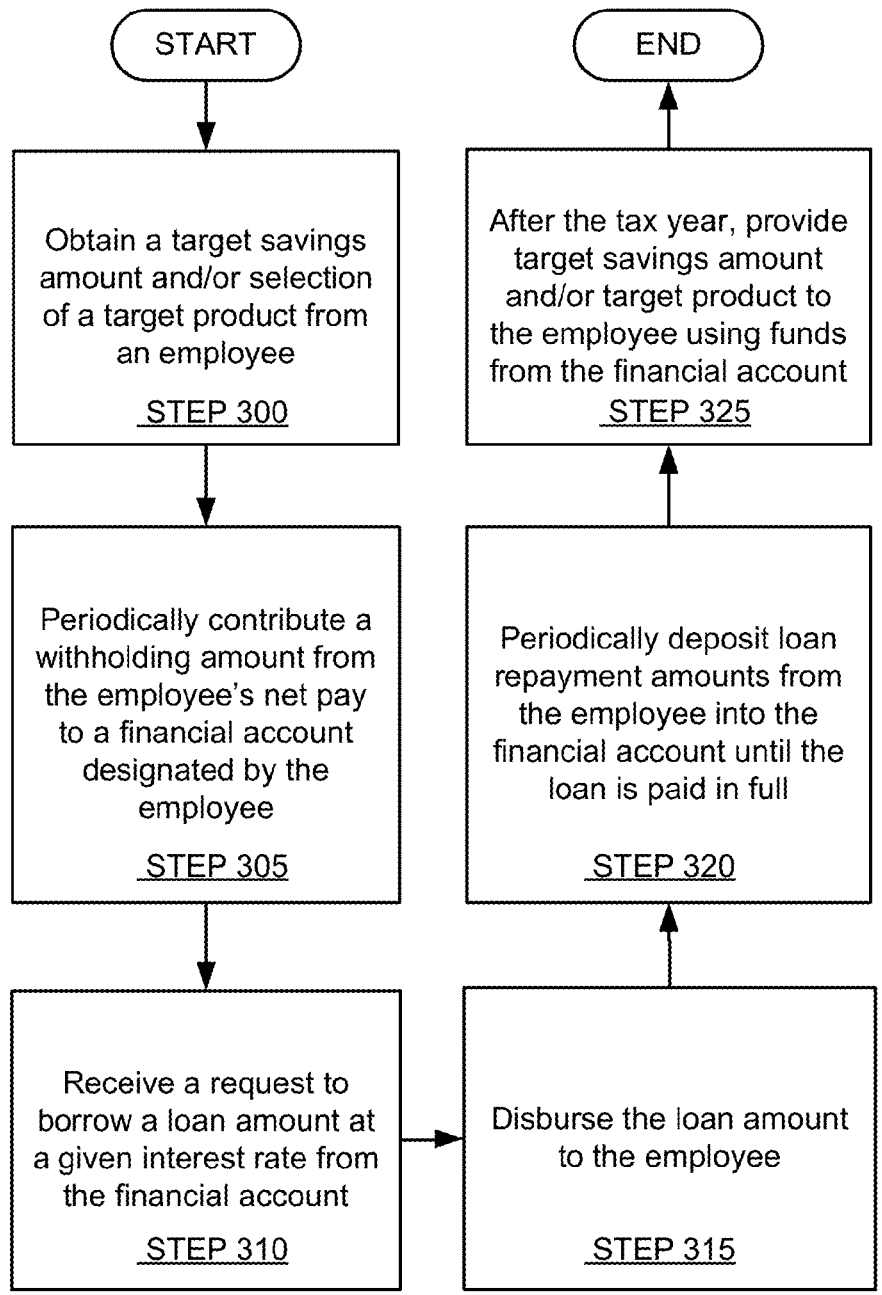

FIG. 3 shows a flowchart in accordance with one or more embodiments of the invention. The steps of the flowchart shown in FIG. 3 may be used to deposit one or more savings withholding amounts from an employee's pay to a financial account. The balance of the financial account may be used for a purchase or made available for withdrawal by the employee after a given date. Those skilled in the art, having the benefit of this detailed description, will appreciate the order and number of steps shown in FIG. 3 may differ among embodiments of the invention. Further, one or more steps in FIG. 3 may be optional.

In STEP 300, a target savings amount and/or selection of a target product are obtained from an employee. As mentioned previously, a tax year or alternate time period must also be specified. STEP 300 is essentially the same as STEP 200 of FIG. 2.

In STEP 305, during the tax year (or alternate time period), a savings withholding amount is periodically contributed from the employee's pay to a financial account designated by the employee. In one or more embodiments of the invention, this happens in conjunction with one or more periodic payroll processes that calculate and disburse employee wages. During each pay cycle, a savings withholding amount corresponding to the target savings amount is deducted from the employee's pay and deposited into the financial account via EFT, check, and/or any other method of transferring financial amounts as commonly known in the art.

In STEP 310, a request to borrow a loan amount from the financial account is received from the employee or an authorized third party. In one or more embodiments of the invention, the financial institution holding the account, the employee, and/or the employer agree to an acceptable interest rate for loans against the financial account. Thus, in one or more embodiments, the employee effectively pays the interest on the account to him/herself as a method of disincentivizing early withdrawals from the financial account and encouraging employees to maintain a higher balance for the benefit of the financial institution holding the account. In one or more embodiments, one or more savings parameters set limits on loan amounts and loan interest rates. For example, an employer may create a savings parameter limiting loan amounts to 50% of the balance of the financial account. Thus, is an employee has a $5000 balance in his/her account, the employee or an authorized third party may only borrow $2500. In another example, an employer and employee may agree to define a savings parameter setting the interest rate of all loans on the account to 10%. In one or more embodiments, the interest rate and loan amount are negotiated on behalf of both parties. Thus, an offer may be provided from the employee to the employer, or vice versa. If both parties agree, the terms of the loan are set. Otherwise, one party may choose to counteroffer. This may continue until acceptable terms are reached, whereupon origination of the loan continues.

In STEP 315, after all terms of the loan are agreed upon, the loan amount is disbursed to the employee or authorized third party. In one or more embodiments of the invention, prior to disbursing the loan amount, loan documentation is presented to the employee or authorized third party and receives a signed (electronic or wet signature) response.

In STEP 320, throughout the remainder of the tax year or alternate time period, loan repayment amounts are periodically deposited from the employee into the financial account until the loan is paid in full. In one or more embodiments of the invention, the loan must be paid in full (according to the agreed-upon terms) prior to the end of the tax year. In one or more embodiments of the invention, the total withholding amounts withdrawn from the employee's net pay are modified (e.g., by a withholdings module (110)) throughout the tax year as required to meet the projected tax liability of the employee without overpayment of taxes. The withholdings module (110) may also adjust savings withholdings if the target savings amount is modified or if the projected price of the target product changes before the end of the tax year. In one or more embodiments of the invention, due to additional interest received in repayment of a loan, or interest lost due to a lower balance in the financial account, the cumulative balance of the financial account will be different than the target savings amount.

In STEP 325, after the tax year or after expiration of the alternate time period, the target savings amount and/or target product are made available to the employee or authorized third party using funds from the financial account. In one or more embodiments of the invention, the employee is prohibited from withdrawing any funds from the financial account during the tax year (or alternate time period). If a target savings amount is defined, the balance of the financial account may be made available to the employee for withdrawal (without penalties). Alternatively, the employee may have to pay a fee (in accordance with one or more savings parameters) to withdraw early. In one or more embodiments of the invention, if a target product is selected, the employee or an authorized third party is required to select a merchant and/or approve a final price of the target product. Once the purchase is made, the product may be made available for pickup at a merchant location by the employee or authorized third party, or may be delivered to a specified address. STEP 325 is essentially the same as STEP 240 of FIG. 2.

Figure 4:
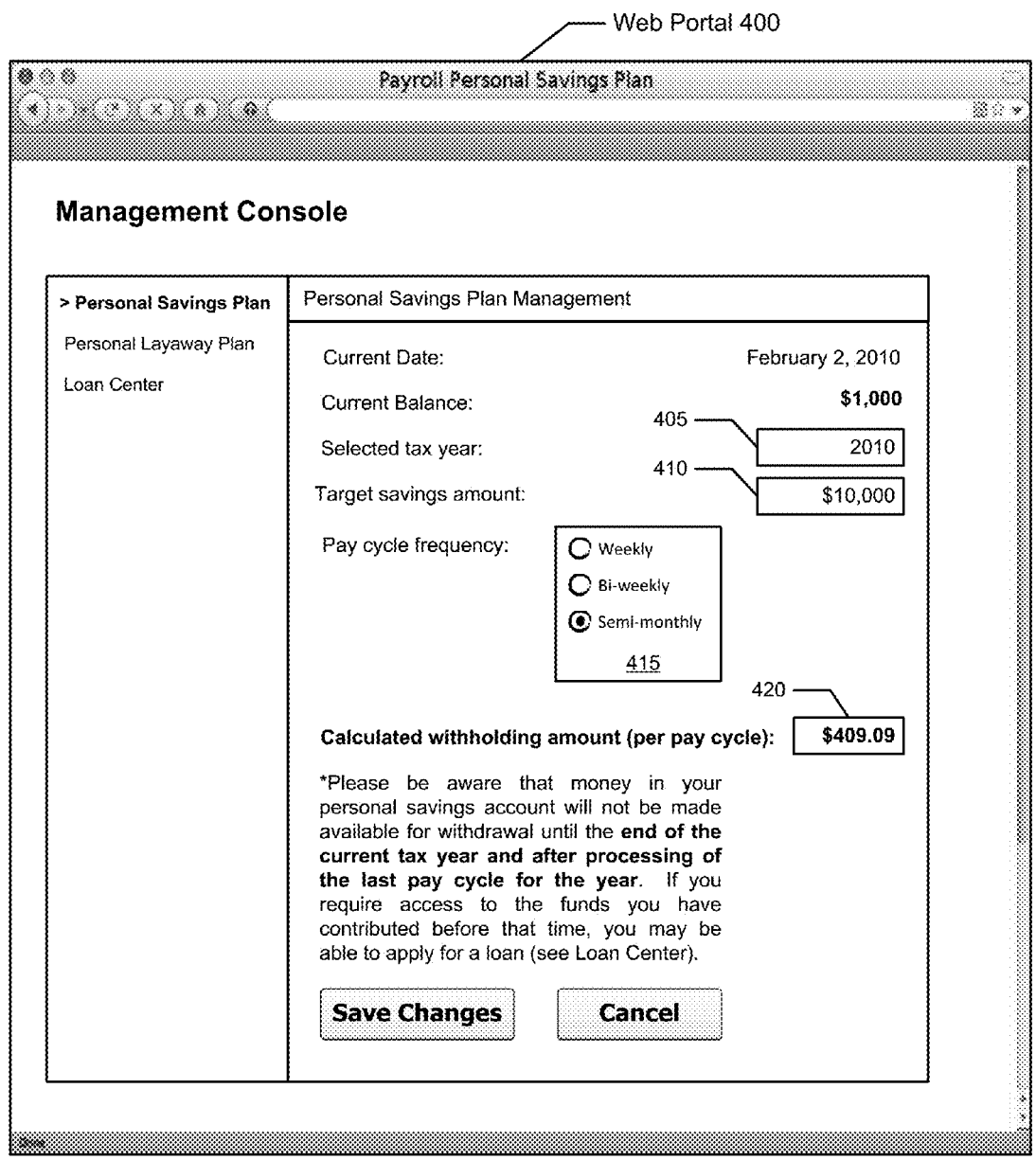
FIG. 4 depicts an example screen shot of an application in accordance with one or more embodiments of the invention.

FIG. 4 depicts an example screen shot of an application in accordance with one or more embodiments of the invention. In this example, a web portal (400) allows an employee to enter a target savings amount (410) for a tax year (405). In the example, the employee has returned (mid tax year) to modify the original target savings amount of $12,000 with a new target savings amount of $10,000. The previous savings withholding amount per pay cycle was $500 ($12,000/24 pay cycles=$500). The employee has indicated that the pay cycle frequency is semi-monthly by selecting the corresponding radio button in the group of controls labeled as 415. After two pay cycles, a total of $1,000 has already been withheld and there are 22 pay cycles left in the year (after February 2). Thus, the new savings withholding amount (420) is $409.09 ($9,000/22 pay cycles=409.09). In the example shown, this calculation has been performed and the result is displayed to the user (i.e., employee).

In one or more embodiments of the invention, merchants compete by placing bids on the target product. The product is then purchased from the merchant with the lowest bid. In one or more embodiments of the invention, this is facilitated by an interface within the product procurement module (e.g., item 115 of FIG. 1) or a web portal (e.g., item 105 of FIG. 1). In one or more embodiments of the invention, the employee or authorized third party hold multiple auctions for merchants to bid on the target product at various times throughout the tax year. If, after an auction, the price of the product (as estimated by the product procurement module) increases beyond an agreed-upon threshold, a subsequent auction may be held to renegotiate the price. Online tools may be used in estimating and tracking product prices.

In one or more embodiments of the invention, savings rules may be defined to modify the target savings amount, target product, and/or other savings parameters based on one or more conditions being satisfied. In one or more embodiments of the invention, savings rules are configured to trigger a notification to the employee when the employee's gross pay increases by a certain percentage or amount. Alternatively, savings parameters may be configured to automatically increase the target savings amount by a predefined amount when the employee's gross pay or net pay increases by a certain percentage or amount. For example, a user may define a savings rule that, if an employee's income increases by a given amount between two pay cycles, automatically increases the savings withholding by a percentage of that amount. The savings rule may further require that the increase in pay be at least $500. Thus, the savings parameter may dictate that if a user's paycheck for a given pay cycle increases by $500, the target savings amount would increase by 10% of the increased amount, or $50. In another example, the user defines a savings rule that changes the selection of a target product based on the employee's annual pay at various times throughout the year. Thus, the savings rule may include a selection of multiple target products corresponding to multiple employee pay amounts. Thus, the rule is executed on a periodic basis to modify the target product selection according to modifications in the employee's pay.

In one or more embodiments of the invention, the web portal (105) outputs a periodic statement to the employee including account balances, target savings amounts, target products, projected tax liability, and/or projected income (e.g., via web portal (105) of FIG. 1). In one or more embodiments of the invention, the employee or authorized third party submits notification of a life event (e.g., buying/selling a home, having a baby, marriage/divorce, new job, etc) which impacts the employee's projected tax liability, target savings amount(s), and/or target product(s). Accordingly, payroll/savings withholdings may be adjusted in order to minimize overpayment/underpayment of taxes and to meet the target savings amount(s) and/or target product(s) requirements.

In one example, an employee defines a target savings amount of $4000. Instead of designating the entire tax year as the time period, the employee chooses to receive his target savings amount on December $5^{th}$ of the tax year. Also, the employee defines the target savings amount on February $10^{th}$ of the tax year. The savings withholding amounts are calculated such that the cumulative balance of the financial account is $4000 by December $5^{th}$ of the tax year. This also includes adjusting for periodic interest payments paid into the account by the financial institution administering the account. Thus, in this example, the alternate time period is February $10^{th}$-December $5^{th}$ of the given tax year.

In one example, an employee intends to save $5000 during the upcoming tax year. The employee logs into a web portal to define the target savings amount as $5000. She enters a projected yearly gross income along with relevant tax information (e.g., number of dependents, other sources of income, etc). During the tax year the payroll system calculates her total withholding amount during each pay cycle. The withholdings module of the payroll system (e.g., withholdings module (110), discussed in reference to FIG. 1 above) updates her projected yearly income and modifies her tax withholdings accordingly in order to minimize underpayment or overpayment of taxes. Also included in the total withholding amount is a periodic contribution to a designated financial account (i.e., a savings withholding). After many pay cycles and during the tax year, the employee incurs a medical expense of $1500. At this point she has accumulated a balance of $2000 in the financial account, though it is not available for withdrawal. She applies to take a loan from this amount through the web portal and finalizes the loan with an agreement to pay back the loaned amount of $1500 plus an interest charge of 10% within 6 months. Over the next 6 months, the payroll system automatically deducts the loan payment from the employee's net pay (as an additional withholding amount) and pays the loan back into the financial account by the six month deadline. Upon completion of the final pay cycle for the tax year, the balance of the financial account equals $5323.95. This amount reflects the original $5000 savings amount, interest paid on the $1500 loan, and an interest amount paid into the account monthly by the financial institution.

In one example, an employee intends to purchase a new 52" LCD television with his tax refund check. He hopes to receive a tax refund of $2000, but he cannot be sure exactly what his refund amount will be for the upcoming year since his income changes periodically due to bonus payments and stock sales. Instead of waiting for the tax refund, prior to the start of the tax year, he logs into a web portal (e.g., item 105 of FIG. 1) connected to his employer's payroll system. There he selects an option for automatic withholding calculation and browses a merchant portal containing a list of products provided by affiliated merchants. After selecting the target product from the list, the employee selects three authorized merchants. The employee also enters an account number of a financial account and a routing number corresponding to the financial institution holding the account. The employee defines a savings parameter which dictates that, after the tax year, the authorized merchant offering the lowest price will be selected to complete the purchase of the target product. Throughout the tax year, tax withholdings of the employee are calculated and deducted from his pay in approximated amounts. These approximations are based on projected tax liability and are updated and refined with every pay cycle to ensure reasonable accuracy and to reduce underpayment or overpayment of taxes. Savings withholdings for the target product are also updated periodically to reflect price changes and to maintain a correct balance in the financial account. The account also earns an interest amount based on the balance of the financial account from the financial institution. As the end of the year nears, the employee modifies the target product via the web portal by selecting a newly released model of the television. Accordingly, savings withholdings for the remainder of the tax year are updated to anticipate the difference in price. Upon completion of the final pay cycle for the selected tax year, each of the three authorized merchants receive electronic notification, via a product procurement module (e.g., item 115 of FIG. 1), that an auction has begun for the purchase of the television. The first merchant offers to sell the television for $2,400. The second and third merchants offer to sell the television for $2100 and $1900, respectively. At this point the employee has accumulated $2020.30 in the financial account. Upon conclusion of the merchant auction, the television is purchased from the third merchant for a price of $1900 including taxes and fees. The merchant delivers the television to the employee's house and the remainder of the money in the financial account ($120.30) is made available for withdrawal by the employee.

In another example, an employee selects a laptop computer as a target product. In this example, via savings parameters, the employee defines certain specifications and features that the laptop should have along with a list of acceptable manufacturers. Upon completion of the tax year, the product procurement module (e.g., item 115 of FIG. 1) searches for laptops matching the defined requirements. However, in this case the employee also defines a savings parameter that sets a maximum price of $1800 for the laptop computer. A laptop matching the defined parameters is not found and the balance of the financial account is instead made available to the employee for withdrawal.

Figure 5:
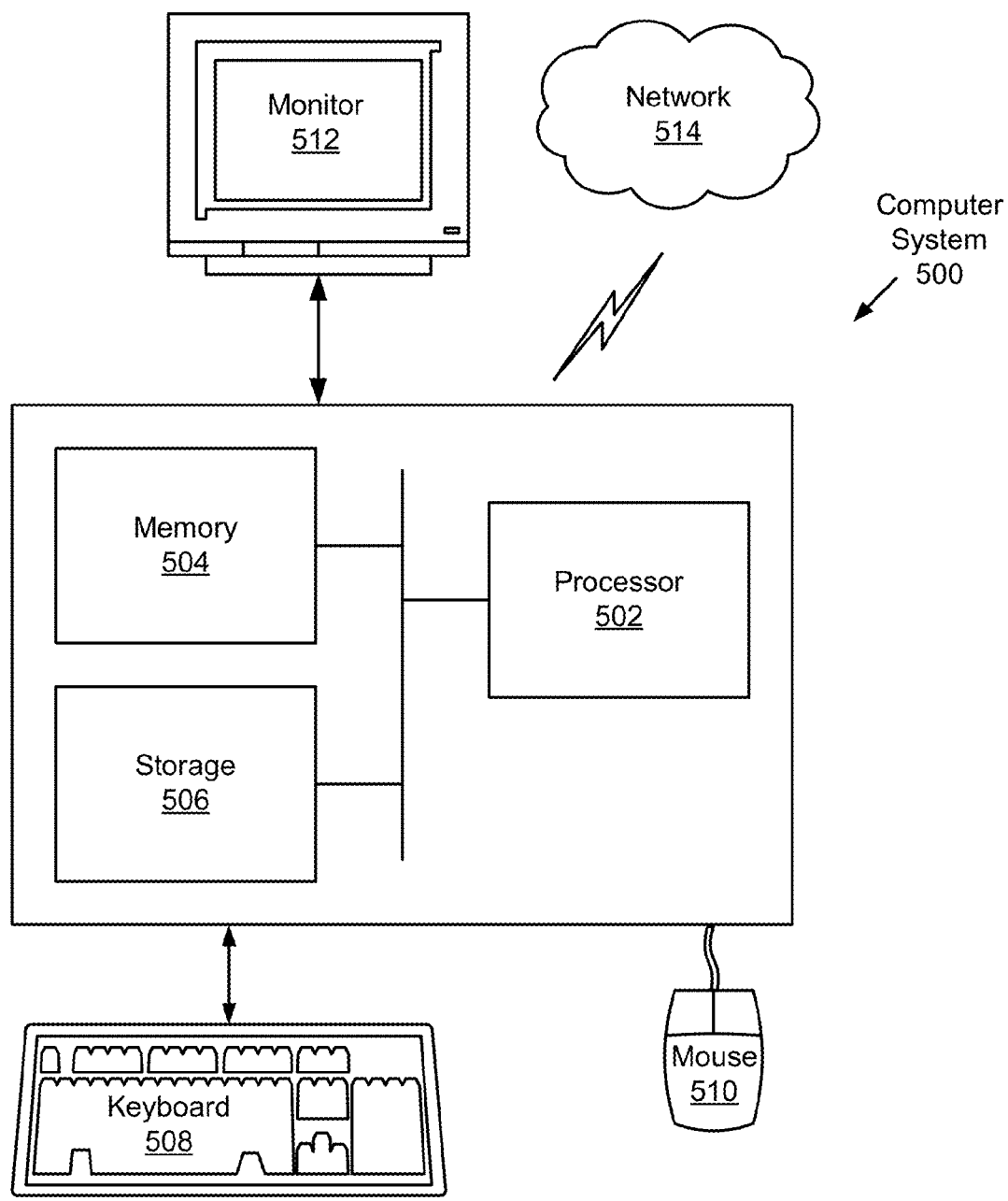
FIG. 5 depicts a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, other hardware processor(s), etc.), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., web portal (105), withholdings module (110), product procurement module (115), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, a magnetic disk, memory, or any other non-transitory computer readable storage device.

One or more embodiments of the invention have one or more of the following advantages. By calculating an employee's tax liability more accurately, it is possible to reduce underpayment or overpayment of an employee's income tax. This allows employees to contribute more money towards a target savings amount and to obtain their saving/purchasing goals without actively managing their money.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for saving money through payroll withholding, comprising:
receiving, by a merchant portal and from an employee, a selection of a physical product from a list of products provided by a plurality of merchants;
obtaining, by a web portal coupled to the merchant portal and for a tax year, a projected tax liability of the employee and a target savings amount corresponding to a price of the physical product selected by the employee;
identifying, by a payroll system coupled to the web portal and for the tax year, a plurality of pay periods for the employee;
calculating, by the payroll system, a plurality of tax withholding amounts for the plurality of pay periods based on the projected tax liability;
calculating, by the payroll system, a plurality of savings withholding amounts for the plurality of pay periods based on the target savings amount;
withholding, by the payroll system, the plurality of tax withholding amounts and the plurality of savings withholding amounts from a plurality of paychecks of the employee corresponding to the plurality of pay periods;
monitoring, by the merchant portal, the price of the physical product;
obtaining, from the merchant portal, a revised price of the physical product;
notifying, by the web portal, the employee of the revised price of the physical product;
obtaining, by the web portal, the approval of the employee to modify at least one of the plurality of savings withholding amounts based on the revised price of the physical product;
modifying, by the payroll system, the at least one of the plurality of savings withholding amounts based on the revised price of the physical product;
sending, by the payroll system, the plurality of tax withholding amounts to a tax authority for paying the projected tax liability;
funding, by the payroll system, a third-party financial account at a financial institution with the plurality of savings withholding amounts;
obtaining, by the web portal and from the employee, a savings rule related to at least one of the target savings amount, the selection of the physical product, the third-party financial account, and the plurality of savings withholding amounts;
applying the savings rule to the at least one of the target savings amount, the selection of the physical product, the third-party financial account, and the plurality of savings withholding amounts;
disbursing, by the payroll system and after withholding the plurality of savings withholding amounts, the target savings amount from the third-party financial account;
sending, by the payroll system to the plurality of merchants, an electronic notification inviting each of the plurality of merchants to offer an auction price of the physical product;
selecting, by the payroll system from the plurality of merchants, a merchant based on the auction price offered by the merchant; and
facilitating, by the payroll system in response to disbursing the target savings amount, purchasing and delivering the physical product for the employee.

2. The method of claim 1, wherein the projected tax liability is less than a sum of the plurality of tax withholding amounts.

3. The method of claim 1, wherein the target savings amount is disbursed to the client after the tax year.

4. The method of claim 1, further comprising:
receiving, from the employee, a request for a loan amount;
disbursing the loan amount from the financial account to the employee; and
depositing, during the tax year, a plurality of loan payments received from the employee into the financial account.

5. The method of claim 4, wherein the plurality of loan amounts comprises an interest amount.

6. The method of claim 1, further comprising:
depositing, during the tax year, a plurality of interest payments accrued on the plurality of savings withholdings amount into the financial account.

7. The method of claim 1, wherein the target savings amount equals a summation of the plurality of savings withholding amounts and an interest amount accrued on at least one of the plurality of savings withholding amounts.

8. A system for saving money through payroll withholding, comprising:
a hardware processor;
a merchant portal comprising functionality to:
display a list of products provided by a plurality of merchants, and
receive, from an employee, a selection of a physical product from the list of products;
monitor the price of the physical product;
a web portal coupled to the merchant portal and comprising functionality to:
obtain, for a tax year, a projected tax liability of an employee and a target savings amount corresponding to a price of the physical product selected by the employee; and
notify the employee of the revised price of the physical product from the merchant portal;
obtain the approval of the employee to modify at least one of the plurality of savings withholding amounts based on the revised price of the physical product;

obtain a savings rule from the employee related to at least one of the target savings amount, the selection of the physical product, the third-party financial account, and the plurality of savings withholding amounts;

a payroll system coupled to the web portal and comprising;
 a withholdings module executing on the hardware processor, and comprising functionality to:
  identify, for the tax year, a plurality of pay periods for the employee;
  calculate, by the withholdings module, a plurality of tax withholding amounts for the plurality of pay periods based on the projected tax liability;
  calculate, by the withholdings module, a plurality of savings withholding amounts for the plurality of pay periods based on the target savings amount;
  withhold, by the withholdings module, the plurality of tax withholding amounts and the plurality of savings withholding amounts from a plurality of paychecks of the employee corresponding to the plurality of pay periods;
  obtain, from the merchant portal, the revised price of the physical product;
  modify at least one of the plurality of savings withholding amounts based on the revised price of the physical product;
  apply the savings rule to at least one of the target savings amount, the selection of the physical product, the third-party financial account, and the plurality of savings withholding amounts;
  send the plurality of tax withholding amounts to a tax authority for paying the projected tax liability;
  fund a third-party financial account at a financial institution with the plurality of savings withholding amounts; and
  disburse, after withholding the plurality of savings withholding amounts, the target savings amount from the third-party financial account; and
 a product procurement module executing on the hardware processor, and comprising functionality to:
  send, to the plurality of merchants, an electronic notification inviting each of the plurality of merchants to offer an auction price of the physical product;
  select, from the plurality of merchants, a merchant based on the auction price offered by the merchant; and
  facilitate, in response to disbursing the target savings amount, purchasing and delivering the physical product for the employee.

9. The system of claim 8, wherein the withholdings module further comprises functionality to:
 receive, from the employee, a request for a loan amount;
 disburse the loan amount from the financial account to the employee; and
 deposit, during the tax year, a plurality of loan payments received from the employee into the financial account.

10. The system of claim 8, wherein the plurality of loan amounts comprises an interest amount.

11. The system of claim 8, wherein the withholdings module further comprises functionality to:
 deposit, during the tax year, a plurality of interest payments accrued on the plurality of savings withholdings amount into the financial account.

12. The system of claim 8, wherein the target savings amount equals a summation of the plurality of savings withholding amounts and an interest amount accrued on at least one of the plurality of savings withholding amounts.

13. A computer-readable storage medium storing a plurality of instructions for saving money through payroll withholding, the plurality of instructions comprising functionality to:
 receive, by a merchant portal and from an employee, a selection of a physical product from a list of products provided by a plurality of merchants;
 obtain, by a web portal coupled to the merchant portal and for a tax year, a projected tax liability of the employee and a target savings amount corresponding to a price of the physical product selected by the employee;
 identify, by a payroll system coupled to the web portal and for the tax year, a plurality of pay periods for the employee;
 calculate, by the payroll system, a plurality of tax withholding amounts for the plurality of pay periods based on the projected tax liability;
 calculate, by the payroll system, a plurality of savings withholding amounts for the plurality of pay periods based on the target savings amount;
 withhold, by the payroll system, the plurality of tax withholding amounts and the plurality of savings withholding amounts from a plurality of paychecks of the employee corresponding to the plurality of pay periods;
 monitor, by the merchant portal, the price of the physical product;
 obtain, from the merchant portal, a revised price of the physical product;
 notify, by the web portal, the employee of the revised price of the physical product;
 obtain, by the web portal, the approval of the employee to modify at least one of the plurality of savings withholding amounts based on the revised price of the physical product;
 modify, by the payroll system, the at least one of the plurality of savings withholding amounts based on the revised price of the physical product;
 send, by the payroll system, the plurality of tax withholding amounts to a tax authority for paying the projected tax liability;
 fund, by the payroll system, a third-party financial account at a financial institution with the plurality of savings withholding amounts;
 obtain, by the web portal and from the employee, a savings rule related to at least one of the target savings amount, the selection of the physical product, the third-party financial account, and the plurality of savings withholding amounts;
 apply the savings rule to the at least one of the target savings amount, the selection of the physical product, the third-party financial account, and the plurality of savings withholding amounts;
 disburse, by the payroll system and after withholding the plurality of savings withholding amounts, the target savings amount from the third-party financial account;
 send, by the payroll system to the plurality of merchants, an electronic notification inviting each of the plurality of merchants to offer an auction price of the physical product;
 select, by the payroll system from the plurality of merchants, a merchant based on the auction price offered by the merchant; and
 facilitate, by the payroll system in response to disbursing the target savings amount purchasing and delivering the physical product for the employee.

14. The computer-readable storage medium of claim 13, wherein the plurality of instructions further comprise functionality to:
- receive, from the employee, a request for a loan amount;
- disburse the loan amount from the financial account to the employee; and
- deposit, during the tax year, a plurality of loan payments received from the employee into the financial account.

\* \* \* \* \*